United States Patent
Kremer et al.

(10) Patent No.: US 6,935,369 B1
(45) Date of Patent: Aug. 30, 2005

(54) HIGH PRESSURE OXYGEN VALVE

(75) Inventors: Paul Kremer, Walferdange (LU); Denis Giraud, Villerupt (FR)

(73) Assignee: Luxembourg Patent Company S.A., Luxembourg (LU)

( * ) Notice: Subject to any disclaimer, the term of this patent is extended or adjusted under 35 U.S.C. 154(b) by 112 days.

(21) Appl. No.: 10/111,908

(22) PCT Filed: Oct. 26, 2000

(86) PCT No.: PCT/EP00/10572

§ 371 (c)(1),
(2), (4) Date: Apr. 26, 2002

(87) PCT Pub. No.: WO01/31239

PCT Pub. Date: May 3, 2001

(30) Foreign Application Priority Data

Oct. 27, 1999 (LU) .......................... 90467

(51) Int. Cl.[7] .............................................. F16K 1/54
(52) U.S. Cl. ................. 137/625.3; 137/625.33
(58) Field of Search ........................ 137/625.3, 625.33; 251/332

(56) References Cited

U.S. PATENT DOCUMENTS 2,595,012 A   4/1952  Smith
3,053,500 A * 9/1962  Atkinson ..................... 251/332
4,261,389 A * 4/1981  Hager et al. ............ 137/625.38
4,688,757 A * 8/1987  Cook et al. .................. 251/210
5,090,450 A   2/1992  Pelech et al.

FOREIGN PATENT DOCUMENTS

| DE | 1209831 | 1/1966 |
| DE | 1404566 | 10/1968 |
| GB | 1213152 | 11/1970 |
| GB | 2224335 | 5/1990 |

* cited by examiner

*Primary Examiner*—John Fox
(74) *Attorney, Agent, or Firm*—Andrus, Sceales, Starke & Sawall, LLP

(57) ABSTRACT

A high pressure valve for oxygen service comprises a valve body (10) with a gas passage (12) and a valve seat (18) associated with the gas passage (12). An obturation unit (22) is movable between a first position, wherein it is spaced from the valve seat (18), and a second position, wherein it is seated on the valve seat (18). This obturation unit (22) has a sealing surface (24) that is in sealing contact with the seat surface (20) in said second position of the obturation unit (22). A metallic sealing element (32) and a synthetic sealing element (34) co-operate to form the sealing surface (24). The metallic sealing element (32) forms the sealing surface (24) around said inner border of the seat surface (20), and the synthetic sealing element (34) forms the sealing surface (24) towards the outer border of the seat surface (20).

30 Claims, 1 Drawing Sheet

HIGH PRESSURE OXYGEN VALVE

CROSS REFERENCE TO RELATED APPLICATION

The present application is the U.S. national stage application of International Application PCT/EP00/10572, filed Oct. 26, 2000, which international application was published on May 3, 2001 as International Publication WO 01/31239. The International Application claims priority of Luxembourg Patent Application 90467, filed Oct. 27, 1999.

FIELD OF THE INVENTION

The present invention generally relates to a high pressure valve for oxygen service and more particularly to such a valve with a synthetic sealing element.

BACKGROUND OF THE INVENTION

High pressure valves with synthetic sealing elements, in particular plastomers as e.g. polyamides (Nylon®)), polychlorotrifluoroethylenes (KEL-F®), polyurethanes or polyetheretherketones, are well known in the art. They provide a far better sealing result than high pressure valves with metallic sealing elements. However, when valves are to be used in oxygen circuits with high flow rates and high gas pressures (as e.g. in oxygen cylinder filling stations), synthetic sealing elements have to be avoided. The reason for avoiding synthetic materials in valves for such applications is the risk of ignition due to adiabatic compression shocks. Rapid and important flow rate increases in a high pressure oxygen circuit—which may e.g. be due to the quick opening of a valve in the circuit—result in an adiabatic compression of the oxygen in the seat area of the valve, which will be accompanied by an important heat generation. Such adiabatic compression shocks can result in temperature peaks that do by far exceed the ignition temperature of known synthetic sealing materials. Once ignition of the synthetic sealing element has started in the oxygen flux, it will quickly spread and will in most cases result in a so called oxygen burnout of the valve. Such an oxygen burnout of the valve does not only destroy the valve, it may also result in fire and explosions.

The risk of important adiabatic compression shocks in the valve—and consequently the risk of oxygen burnout of the valve—increases with gas pressure. Therefore, oxygen valves to be used for pressures above 200 bars have nowadays exclusively metallic sealing elements. However, high pressure valves with metallic sealing elements provide less good sealing results than high pressure valves with synthetic sealing elements.

OBJECT OF THE INVENTION

A technical problem underlying the present invention is to provide a high pressure valve for oxygen service with a good adiabatic compression resistance and a good sealing result.

SUMMARY OF THE INVENTION

This problem is solved by a high pressure valve for oxygen service as claimed in the claims.

A high pressure valve in accordance with the present invention comprises a valve body with a gas passage and a valve seat associated with this gas passage. The valve seat has an annular seat surface, extending between an inner and outer border. An obturation unit is movable in the valve body between a first position, wherein it is spaced from the valve seat, and a second position, wherein it is seated on the valve seat. This obturation unit has a sealing surface that is in sealing contact with the seat surface in said second position of the obturation unit. In accordance with an important aspect of the present invention, the valve comprises a metallic sealing element and a synthetic sealing element co-operating to form the sealing surface. The metallic sealing element forms the sealing surface around the inner border of the seat surface, whereas the synthetic sealing element forms the sealing surface towards the outer border of the seat surface. It will be appreciated that the metallic seal is responsible for good test results in adiabatic compression tests with oxygen, because it forms that part of the sealing surface that is the most exposed to overheating in case of an adiabatic compression shock in the valve, in particular if the valve is fully closed or only slightly open. The synthetic sealing element forms the rest of the sealing surface in a more protected position and is responsible for good sealing results at high pressures.

The metallic sealing element and the synthetic sealing element preferably co-operate to form a flat composite sealing surface. This can be advantageously achieved by housing the metallic sealing element in an annular groove of the synthetic sealing element. In this case the synthetic sealing element is advantageously a seal ring with an annular groove along an inner border. The metallic sealing element could be a metallic disc centred in the synthetic sealing element, but it is preferably only a thin seal ring housed in an annular groove of the synthetic sealing element. It is made of a ductile metal that does not react with oxygen and has a good thermal conductivity. A preferred material is e.g. silver. The synthetic sealing element is preferably made of a plastomer.

In a preferred embodiment, the obturation unit includes a cylindrical projection protruding beyond the sealing surface. This cylindrical projection is slidingly fitted in a cylindrical bore of the gas passage. In the fully closed valve, the small radial play subsisting between the cylindrical walls of the cylindrical projection and the cylindrical bore is axially closed by the metallic sealing element. In case of an adiabatic shock in the fully closed valve, the compression heat will be dissipated in the small radial play subsisting between the cylindrical walls of the cylindrical projection and the cylindrical bore. As this space is axially closed by the metallic sealing element, there is no contact between the hot oxygen and the synthetic sealing element.

The aforementioned cylindrical projection advantageously includes a frontal orifice in its front surface, at least one lateral orifice in its cylindrical lateral surface and an internal gas passage providing a connection between the frontal orifice and the at least one lateral orifice. Thus the cylindrical projection is capable of radially deviating the axial gas stream in the opened valve, so that no gas stream impinges on the sealing surface. A further advantage of this embodiment is that the flow rate changes more progressively when the valve is actuated. This helps to prevent pressure shocks in the circuit.

In a preferred embodiment the seat has the form of a cylindrical ring protruding in a seat chamber of the valve body. The obturation unit then has an annular groove wherein the sealing surface forms an annular bottom area. The cylindrical seat ring is received in the annular groove when the obturation unit is brought in its second position. It will be appreciated that the ring and the groove then co-operate to form a sort of labyrinth passage, which reduces gas flow when the valve is only slightly opened.

In a preferred embodiment the obturation unit includes an outer body with a frontal cylindrical cavity therein and a central cylindrical body axially screwed into the outer body, so as to define an annular groove in the frontal cylindrical cavity. This central body has a shoulder bearing on the metallic sealing element, which is housed in an annular groove of the synthetic sealing element, so that the central body fixes the metallic and the synthetic sealing elements in the annular groove.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
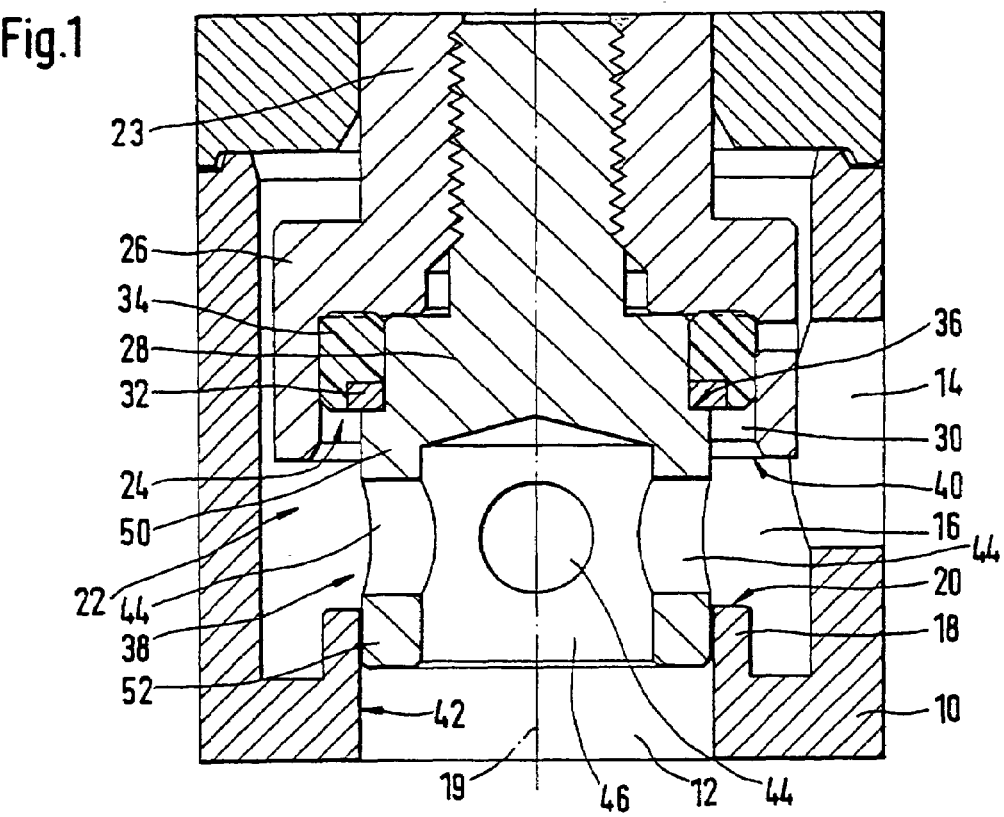
FIG. 1: is a sectional view showing in detail a valve and an obturation unit of a valve in accordance with the invention, wherein the obturation unit is spaced from the valve seat.
Figure 2:
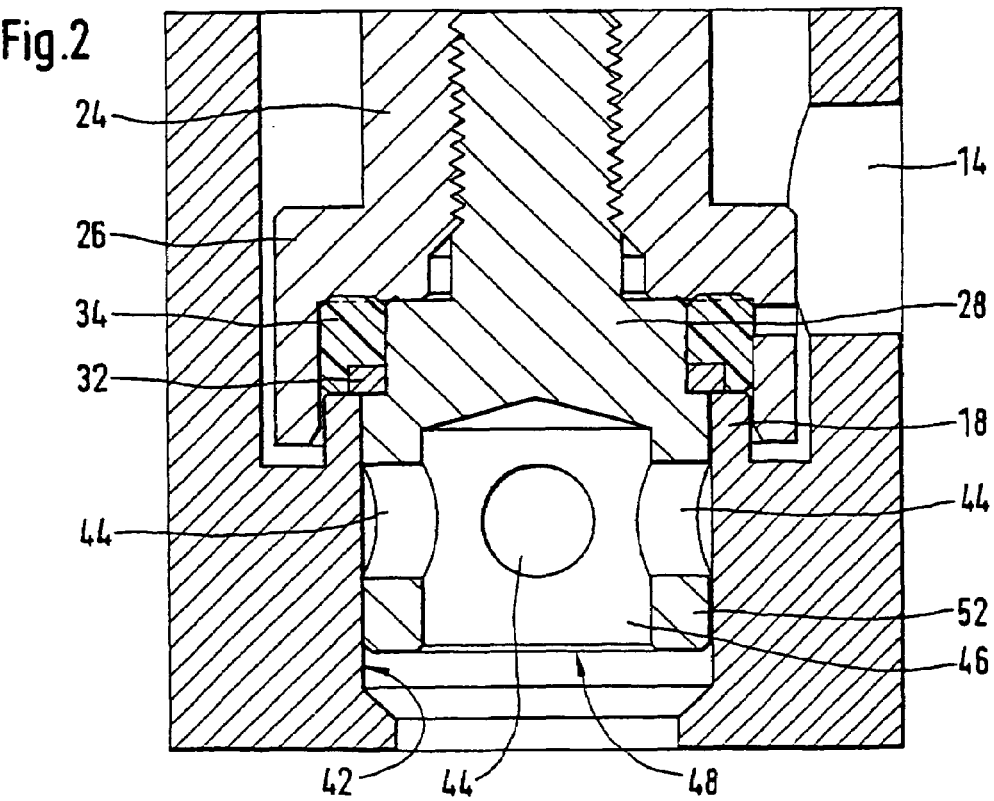
FIG. 2: is a sectional view as FIG. 1, wherein the obturation unit is seated on the valve seat.

FIGS. 1 and 2 show in detail a valve seat and an obturation unit of a corner stop valve, which is conceived for oxygen service at gas pressures above 300 bar. Such a valve is e.g. advantageously used as a stop valve in oxygen cylinder filling stations.

The valve shown in FIGS. 1 and 2 comprises a valve body 10 with an inlet gas passage 12 and an outlet gas passage 14, which open in a seat chamber 16 at right angles to each other. A seat 18, which has the form of a cylindrical ring, protrudes in the valve chamber 16, wherein the inlet gas passage 12 passes axially through the ring shaped seat 18. Reference number 19 identifies the central axis of the ring shaped seat 18. A flat annular seat surface 20 is defined by the frontal top surface of the ring shaped seat 18.

Reference number 22 identifies an obturation unit associated with the seat 18. This obturation unit 22 is connected to an actuating stem 23, which is connected itself to an actuating device (not shown). The latter enables to move the obturation unit 22 in the seat chamber 16 along the axis 19 between a first position (shown in FIG. 1), wherein the obturation unit 22 is spaced from the valve seat 18, so that the valve is fully open, and a second position (shown in FIG. 2), wherein the obturation unit 22 is seated on the valve seat 18, so that the valve is fully closed. In the closed position of the valve, i.e. when the obturation unit 22 is in its second position, a sealing surface 24 of this obturation unit 22 is pressed against the seat surface 20.

The obturation unit 22 comprises an outer body 26, with a frontal cylindrical cavity therein, and a central cylindrical body 28 axially screwed into the outer body 26, so as to define an annular groove 30 in the frontal cylindrical cavity. When the obturation unit 22 is in its second position shown in FIG. 2, the ring shaped seat 18 is received within the annular groove 30, wherein the sealing surface 24, which is pressed against the seat surface 20, forms the annular bottom area of the annular groove 30.

In accordance with an important aspect of the present invention, the sealing surface 24 is a composite sealing surface, formed by co-operation of a metallic sealing element 32 and a synthetic sealing element 34. The metallic sealing element 32 forms the sealing surface 24 which is in direct contact with the seat surface 18 around the inner border of the annular seat surface 18. The synthetic sealing element 34 forms the rest of the sealing surface 24 towards the outer border of the seat surface 20.

The synthetic sealing element 34 is preferably a seal ring made of a plastomeric material (as e.g. polyamides (Nylon®), polychlorotrifluoroethylenes (KEL-F®), polyurethanes or polyethers). Preferred plastomeric materials are e.g. polyetheretherketones (PEEK) or polyethersulphones. As seen on FIGS. 1 and 2, the seal ring 34 has a substantially rectangular cross-section, wherein its outer diameter corresponds to the inner diameter of the frontal cavity in the outer body 26. It should be noted that the two rear edges and the outer frontal edge of the seal ring 34 are chamfered, whereas the inner frontal edge is replaced by a groove. In this groove is housed the metallic sealing element 32, which has the form of a thin ring. This thin ring is preferably made of silver, which is a ductile metal that does not react with oxygen and has moreover a good thermal conductivity. Other possible materials are e.g. gold and platinum, but these materials are of course much more expensive than silver. A shoulder 36 on the central cylindrical body 28 fixes the synthetic seal ring 34 and the metallic ring 32 in the annular groove 30, in which the two ductile seal rings 28, 32 are embedded, with a minimum radial play with regard to the two cylindrical walls of the groove. It will be noted that the shoulder 36 bears on the metallic ring 32, but that the latter radially projects beyond the shoulder to the inner annular segment of the sealing surface 24 in the annular groove 30.

The central cylindrical body 28 includes a cylindrical projection 38 protruding beyond the sealing surface 24 and the front surface 40 of the outer body 26. This cylindrical projection 38 is slidingly fitted in a cylindrical bore 42 at the outlet of the inlet gas passage 12 in the seat chamber 16. It has four lateral orifices 44 in its cylindrical lateral surface. These lateral orifices 44 open into a central blind hole 46 that forms a frontal orifice 48 in the front surface of the cylindrical projection 38. A cylindrical base 50 axially separates the lateral orifices 44 from the sealing surface 24.

When the obturation unit 22 is in its sealing position shown in FIG. 2, the lateral orifices 44 are located well inside the cylindrical bore 42. The small radial play subsisting between the cylindrical walls of the base 50 and the bore 42 is sealed at the inner border of the seat surface 20 by the metallic seal ring 32. It follows that in this closed position of the valve, the synthetic sealing element 34 is well protected against direct contact with the gas and therefore against ignition in case of an adiabatic compression shock in the closed valve. Hot oxygen entering in the radial play subsisting between the cylindrical walls of the base 50 and the bore 42 is stopped by the metallic seal ring 32 and cannot come into contact with the synthetic sealing element 34.

As soon as the obturation unit 22 is slightly lifted from its seat 18, an annular gas stream establishes in the small radial play subsisting between the cylindrical walls of the base 50 and the bore 42. At the outlet of the cylindrical bore 42, the annular gas stream, which is still co-axial with the axis 19, impinges on the metallic seal ring 32. The latter deviates the gas stream in the small gap separating the seat surface 20 and the sealing surface 24. At the outer border of the seat 18, the gas stream is a second time deviated to flow through the annular gap between the outer cylindrical surface of the seat 18 and the cylindrical surface of the outer body 26 defining the outer wall of the groove 30. Thereafter the gas stream enters the seat chamber 16 and leaves the valve through the outlet gas passage 14. It will be appreciated that the region of the sealing surface 24, which is the most exposed to direct contact with a hot oxygen stream, is the section that has to radially deviate the annular gas stream. In accordance with the invention this section of the sealing surface is formed by the metallic seal ring 32. It will further be appreciated that the high flow resistance of the labyrinth type flow path limits gas flow and consequently—in case of an adiabatic compression shock in the valve—heat flux through the gap separating the seat surface 20 and the sealing surface 24. It follows that the synthetic seal ring 34 will be exposed to relatively low temperatures in case of an adiabatic compression shock in the slightly opened valve.

If the obturation unit 22 is further lifted from its seat 18, the lateral orifices 44 progressively open into the seat chamber 16. It follows that a more and more important gas stream flows through the blind bore 46 and the lateral orifices 44 directly into the seat chamber 16. As this gas stream is radially deviated in the cylindrical projection 38, it does not impinge on the sealing surface 24. Consequently, if an adiabatic compression shock occurs in the opened valve, most of the compression heat will be dissipated in the solid cylindrical projection 38, without any major effect on the synthetic sealing ring 34.

In FIG. 1 the valve is shown in its fully opened position. It will be noted that the lateral orifices 44 are now fully located in the seat chamber 16. A cylindrical foot 52 of the cylindrical projection 38 closes the cylindrical bore 42 and prevents an axial gas stream from impinging on the sealing surface 24.

In conclusion, the present invention provides a high pressure oxygen valve with a synthetic sealing element that nevertheless has good test results in adiabatic compression tests with oxygen at pressures above 300 bar.

What is claimed is:

1. A high pressure gas valve for oxygen service, comprising:
   a valve body with a gas inlet passage;
   a valve seat associated with said gas inlet passage, said valve seat having an annular seat surface, said annular seat surface extending between an inner and outer border;
   an obturation unit movable in said valve body between a first position, wherein it is spaced from said valve seat, and a second position, wherein it is seated on said valve seat, said obturation unit having a sealing surface that is in sealing contact with said seat surface in said second position of said obturation unit; and
   a metallic sealing element and a synthetic sealing element co-operating to form said sealing surface, wherein said metallic sealing element forms the sealing surface around said inner border of said seat surface, and said synthetic sealing element forms said sealing surface towards said outer border of said seat surface;
   wherein said metallic sealing element is housed in an annular groove of said synthetic sealing element, so as to co-operate with said synthetic sealing element to form a flat composite sealing surface.

2. The high pressure gas valve according to claim 1, wherein said synthetic sealing element is a seal ring with an annular groove along an inner border.

3. The high pressure gas valve according to claim 2, wherein said metallic sealing element is a thin seal ring housed in said annular groove.

4. The high pressure gas valve according to claim 3, wherein said metallic sealing element is made of a soft metal.

5. The high pressure gas valve according to claim 4, wherein said metallic sealing element is made of silver.

6. The high pressure gas valve according to claim 3, wherein said synthetic sealing element is made of a plastomer.

7. The high pressure gas valve according to claim 1, wherein
   said obturation unit includes a cylindrical projection protruding beyond said sealing surface; and
   said gas passage includes a cylindrical bore in which said cylindrical projection is slidingly fitted;
   wherein in the fully closed valve, the small radial play subsisting between the cylindrical walls of the cylindrical projection and the cylindrical bore is axially closed by said metallic sealing element.

8. The high pressure gas valve according to claim 7, wherein said cylindrical projection includes:
   a frontal orifice in its front surface,
   at least one lateral orifice in its cylindrical lateral surface, and
   an internal gas passage providing a connection between said frontal orifice and said at least one lateral orifice.

9. A high pressure gas valve for oxygen service, comprising:
   a valve body with a gas inlet passage and a seat chamber;
   a valve seat associated with said gas inlet passage, said valve seat having the form of a cylindrical ring projecting into said seat chamber and forming therein an annular seat surface, said annular seat surface radially extending between an inner and outer border;
   an obturation unit movable in said valve body between a first position, wherein it is spaced from said valve seat, and a second position, wherein it is seated on said valve seat, said obturation unit having an annular groove receiving said cylindrical ring in said second position of said obturation unit and a sealing surface forming an annular bottom area in said annular groove, said sealing surface being in sealing contact with said seat surface in said second position of said obturation unit; and
   a metallic sealing element and a synthetic sealing element co-operating to form said sealing surface, wherein said metallic sealing element forms the sealing surface around said inner border of said seat surface, and said synthetic sealing element forms said sealing surface towards said outer border of said seat surface.

10. The high pressure gas valve according to claim 9, wherein said obturation unit includes:
    an outer body with a frontal cylindrical cavity therein;
    a central cylindrical body axially screwed into said outer body so as to define said annular groove in said frontal cylindrical cavity;
    wherein said central body has a shoulder bearing on said metallic sealing element, which is housed in an annular groove of said synthetic sealing element, so that said central body fixes said metallic and said synthetic sealing elements in said annular groove.

11. The high pressure gas valve according to claim 10, wherein said central cylindrical body axially protrudes from said frontal cylindrical cavity.

12. The high pressure valve according to claim 11, wherein said central cylindrical body is slidingly fitted in said gas passage of said valve seat.

13. The high pressure gas valve according to claim 12, wherein said central cylindrical body includes:
- an axial orifice arranged in its front surface,
  lateral orifices arranged in its cylindrical lateral surface, and internal gas passages providing a connection between said axial orifice and said lateral orifices,
  wherein said lateral orifices lie in said gas passage when said obturation unit is in its second position, and above said seat in said valve chamber when said obturation unit is in its first position.

14. The high pressure gas valve according to claim 9, wherein said metallic sealing element is made of a soft metal.

15. The high pressure gas valve according to claim 14, wherein said metallic sealing element is made of silver.

16. The high pressure gas valve according to claim 9, wherein said metallic sealing element and said synthetic sealing element co-operate to form a flat composite sealing surface.

17. The high pressure gas valve according to claim 9, wherein said metallic sealing element is housed in an annular groove of said synthetic sealing element, so as to co-operate with said synthetic sealing element to form a flat composite sealing surface.

18. The high pressure gas valve according to claim 17, wherein said synthetic sealing element is a seal ring with an annular groove along an inner border.

19. The high pressure gas valve according to claim 18, wherein said metallic sealing element is a thin seal ring housed in said annular groove.

20. The high pressure gas valve according to claim 19, wherein said metallic sealing element is made of a soft metal.

21. The high pressure gas valve according to claim 20, wherein said metallic sealing element is made of silver.

22. The high pressure gas valve according to claim 21, wherein said synthetic sealing element is made of a plastomer.

23. The high pressure gas valve according to claim 9, wherein
said obturation unit includes a cylindrical projection protruding beyond said sealing surface; and
said gas passage includes a cylindrical bore in which said cylindrical projection is slidingly fitted;
wherein in the fully closed valve, the small radial play subsisting between the cylindrical walls of the cylindrical projection and the cylindrical bore is axially closed by said metallic sealing element.

24. The high pressure gas valve according to claim 23, wherein said cylindrical projection includes:
a frontal orifice in its front surface,
at least one lateral orifice in its cylindrical lateral surface, and
an internal gas passage providing a connection between said frontal orifice and said at least one lateral orifice.

25. A high pressure gas valve for oxygen service, comprising:
a valve body with a gas inlet passage including a cylindrical bore;
a valve seat associated with said gas inlet passage, said valve seat having an annular seat surface, said annular seat surface radially extending between an inner and outer border;
an obturation unit movable in said valve body between a first position, wherein it is spaced from said valve seat, and a second position, wherein it is seated on said valve seat, said obturation unit having a sealing surface that is in sealing contact with said seat surface in said second position of said obturation unit;
said obturation unit including a cylindrical projection protruding beyond said sealing surface and being fitted with a small radial play in said cylindrical bore of said valve body so as to delimit therein an annular gas passage; and
a metallic sealing element and a synthetic sealing element co-operating to form said sealing surface, wherein said synthetic sealing element forms said sealing surface towards said outer border of said seat surface and said metallic sealing element forms said sealing surface around said inner border of said seat surface and axially closes said annular gas passage in said second position of said obturation unit,
wherein said metallic sealing element is housed in an annular groove of said synthetic sealing element, so as to co-operate with said synthetic sealing element to form a flat composite sealing surface.

26. The high pressure gas valve according to claim 25, wherein said synthetic sealing element is a seal ring with an annular groove along an inner border.

27. The high pressure gas valve according to claim 26, wherein said metallic sealing element is a thin seal ring housed in said annular groove.

28. A high pressure gas valve for oxygen service, comprising:
a valve body with a gas inlet passage;
a valve seat associated with said gas inlet passage, said valve seat having an annular seat surface, said annular seat surface extending between an inner and outer border;
an obturation unit movable in said valve body between a first position, wherein it is spaced from said valve seat, and a second position, wherein it is seated on said valve seat, said obturation unit having a sealing surface that is in sealing contact with said seat surface in said second position of said obturation unit; and
a sealing element made of a soft metal and a synthetic sealing element cooperating to form said sealing surface, wherein said sealing element made of a soft metal forms the sealing surface around said inner border of said seat surface, and said synthetic sealing element forms said sealing surface towards said outer border of said seat surface,
wherein said sealing element made of a soft metal is housed in an annular groove of said synthetic sealing element, so as to co-operate with said synthetic sealing element to form a flat composite sealing surface.

29. The high pressure gas valve according to claim 28, wherein said sealing element made of a soft metal is a thin silver seal ring housed in said annular groove.

30. A high pressure gas valve for oxygen service, comprising:
a valve body with a gas inlet passage;
a valve seat associated with said gas inlet passage, said valve seat having an annular seat surface, said annular seat surface extending between an inner and outer border;
an obturation unit movable in said valve body between a first position, wherein it is spaced from said valve seat, and a second position, wherein it is seated on said valve seat, said obturation unit having a sealing surface that is in sealing contact with said seat surface in said second position of said obturation unit; and a sealing element made of a soft metal and a synthetic sealing element cooperating to form said sealing surface, wherein said sealing element made of a soft metal forms the sealing surface around said inner border of said seat surface, and said synthetic sealing element forms said sealing surface towards said outer border of said seat surface, wherein said synthetic sealing element is a seal ring with an annular groove along an inner border.

* * * * *